No. 877,463. PATENTED JAN. 21, 1908.
J. D. LEWIS.
MEAT ROASTER.
APPLICATION FILED JAN. 22, 1906.
2 SHEETS—SHEET 1.
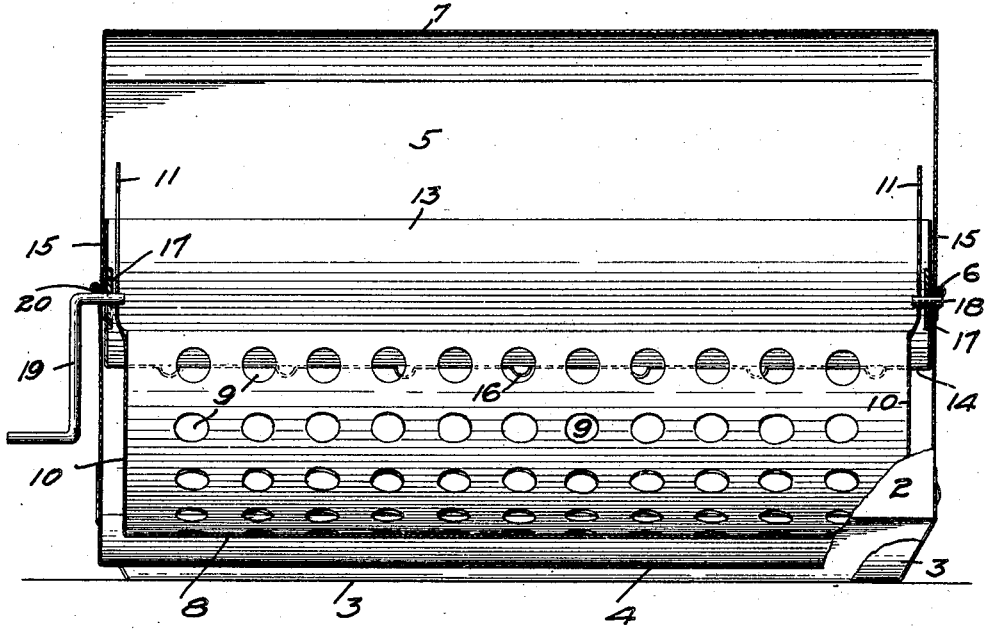
FIG. 1.
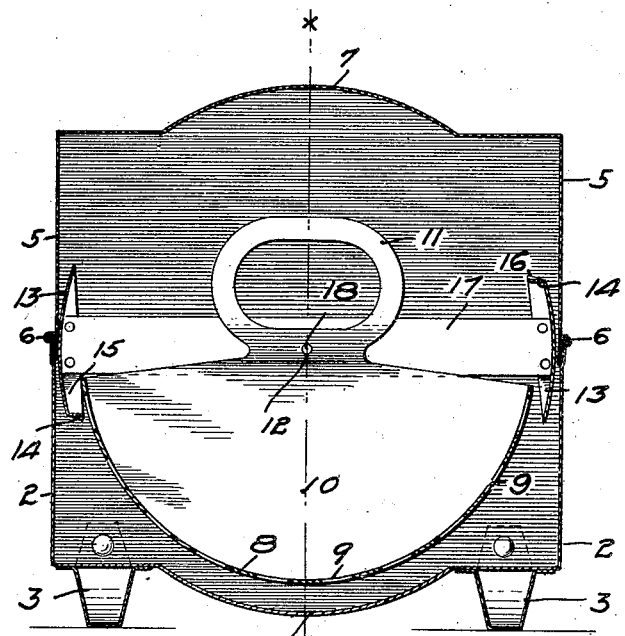
FIG. 2.
FIG. 3.
WITNESSES
INVENTOR
JOSEPH D. LEWIS
BY
HIS ATTORNEYS No. 877,463. PATENTED JAN. 21, 1908.
J. D. LEWIS.
MEAT ROASTER.
APPLICATION FILED JAN. 22, 1906.
2 SHEETS—SHEET 2.
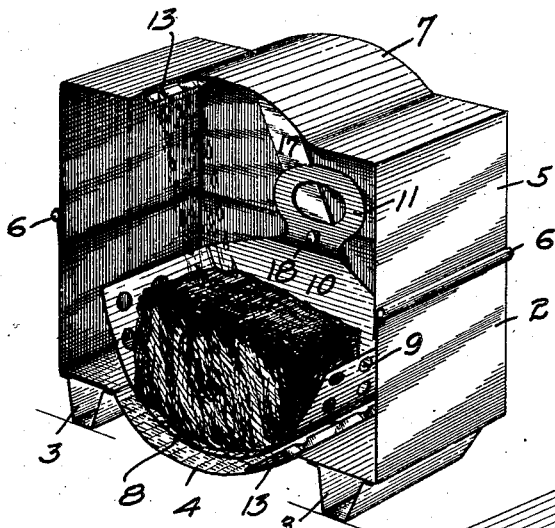
FIG. 4.
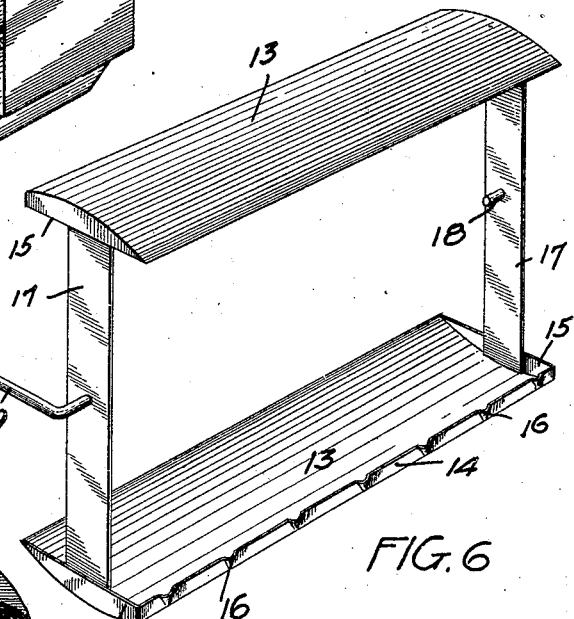
FIG. 6
FIG. 7
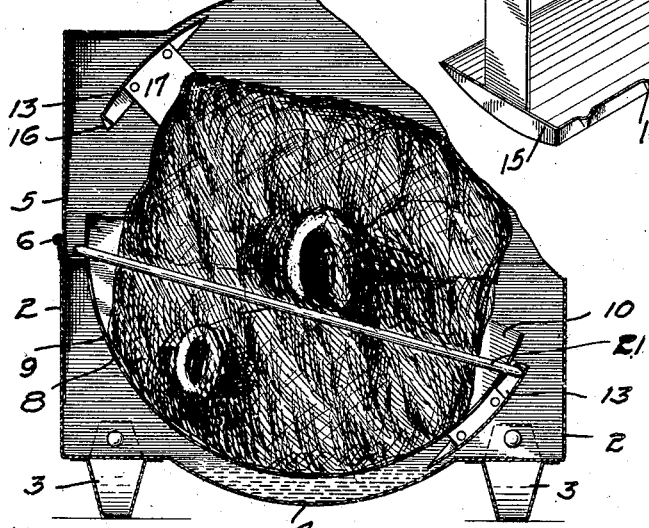
FIG. 5
WITNESSES
INVENTOR
JOSEPH D. LEWIS
BY
HIS ATTORNEYS

UNITED STATES PATENT OFFICE.

JOSEPH D. LEWIS, OF ST. PAUL, MINNESOTA.

MEAT-ROASTER.

No. 877,463.   Specification of Letters Patent.   Patented Jan. 21, 1908.

Application filed January 22, 1906. Serial No. 297,091.

*To all whom it may concern:*

Be it known that I, JOSEPH D. LEWIS, of St. Paul, Ramsey county, Minnesota, have invented certain new and useful Improvements in Meat-Roasters, of which the following is a specification.

My invention relates to meat roasters, and particularly to devices used in connection therewith for basting the meat while being roasted, the object of my invention being to insure a continuous uniform distribution of the juices and gravy over the roast while cooking without the usual labor and annoyance incident to this operation, as usually performed.

A further object is to provide a roaster of simple and economical construction, and one which can be easily kept clean and the parts of which readily assembled for use or separated when the meat is cooked.

Other objects of the invention will appear from the following detailed description.

The invention consists, generally, in various constructions and combinations all as hereinafter described and particularly pointed out in the claims.

In the accompanying drawings forming part of this specification, Figure 1 is a longitudinal vertical sectional view on the line x—x of Fig. 2. Fig. 2 is a transverse vertical section. Fig. 3 is a detail view illustrating the manner of supporting the false bottom within the base or lower portion of the roaster. Fig. 4 is a perspective sectional view showing the position of the meat in the false bottom and the basting device in operation. Fig. 5 is a transverse vertical sectional view showing the manner of revolving the basting device around the roast. Fig. 6 is a perspective view of the basting device. Fig. 7 is a detail view of one end of the scoop device showing the position of the spouts therein.

In the drawing, 2 represents a sheet metal base of or body having suitable supports 3 for raising it above the floor of the oven, and a downwardly curved bottom 4 intermediate to said supports.

5 represents the top of the roaster having edges which fit within the upper edges of the lower portion, and a bead 6 to rest upon the edges of said lower portion and support the top in proper position thereon. This top 5 has a convex middle portion 7 above and corresponding substantially, though reversely arranged, to the curve in the bottom of the lower portion. The roaster is preferably rectangular in form with square corners, but these may be rounded if preferred, and in various ways the shape may be modified. Several sizes will be made to accommodate large and small roasts.

8 is a false bottom substantially semicylindrical in form, having a series of perforations 9 and imperforate end walls 10 terminating at the top in suitable lifting handles 11. These end walls are provided with circular openings 12.

13 represents scoops having curved bottoms and flanges 14 on one longitudinal edge, and end flanges 15 forming right angle continuations of the flanges 14. The opposite longitudinal edge of each scoop is unobstructed to facilitate the gathering up of the grease and juices in the bottom of the roaster, as will hereinafter appear. The flanges 14 are preferably provided at intervals with little spouts 16, those of one flange alternating in position with those of the other flange, to insure the even distribution of the basting juices. Bars 17 connect the opposite ends of the scoops as shown in Fig. 6. A gudgeon pin 18 is mounted in the bar 17 centrally thereof extending through on both sides, and a crank 19 in the opposite bar has its end projecting therethrough and forming a gudgeon at that point. The lower portion of the roaster is provided with recesses 20 in each end wall to receive the outer end of the gudgeon 18 and the crank 19 outside the bar in which it is mounted; and these journals or bearings of the basting device are a sufficient distance above the curved floor or bottom 4 to allow the scoops or gatherers to be revolved within the roaster and gather up the grease and juices which will collect in the curved bottom 4, and lift them to a point over the roast.

The inner end of the gudgeon 18 and the crank 19 are adapted to form supports for the end walls 10 of the false bottom, said walls having sufficient spring or flexibility to allow them to be pressed inwardly, as indicated by dotted lines in Fig. 3, to permit the ends of the gudgeons to enter the holes 12, and permit the ready disengagement of the false bottom from the gudgeons, or its insertion therein. As the juices are gathered up from the bottom of the roaster by the scoops they will flow back against the flanges 14, and then as the upper scoop becomes inverted over the roast the juices and grease gathered up will flow through the spouts 16 and be distributed evenly over the whole length of the roast. Without these spouts the discharge from the scoop might be made in one place, and one portion of the roast be unbasted. The perforations in the false bottom allow the juices that run down over the meat as they are extracted from the meat by the cooking operation to flow down into the bottom of the roaster and be gathered up by the revolving scoops.

Any suitable distance may be provided between the curved bottom 8 and the floor of the roaster, but I prefer to have only sufficient space for the scoops to freely pass therethrough and perform their gathering function. In place of having the false bottom remain stationary and the scoops revolve around it, I may fasten the roast in the false bottom, by any suitable means as by a skewer 21, which, as shown in Fig. 5, is thrust through the roast with its ends projecting into the holes in the floor 8. This will secure the roast in the false bottom, and the ends of the skewer project through the holes a sufficient distance to engage the flanges of the basting scoops, as shown in Fig. 5, so that when the scoops are revolved one of them will engage the end of the scoop and revolve the roast ahead of it, and both of them will gather up the grease and juices and discharge them upon the top of the roast at a certain point in their revolution. A roaster of this kind permits the thorough mixing and stirring of the gravy by the revolving action of the gathering scoops. Whenever desired, the meat, though normally stationary, can be revolved also. The pan or false bottom, in which the meat is supported is reversible, and may be turned around in the roaster to reverse the position of the meat whenever desired.

The shape of the scoops will prevent the gravy from being thrown out by centrifugal force during the revolving operation, and consequently the cover of the roaster may be omitted whenever desired without danger of the juices or grease being thrown out against the walls of the oven.

The manner of supporting the false bottom in the roaster allows the meat to be handled easily and conveniently, as the cook can grasp the handles at the ends of the false bottom and very readily place the meat in the roaster, or remove it.

I claim as my invention:

1. A meat roaster comprising a suitable casing, a perforated pan therein adapted to contain meat to be cooked, means supporting the ends of said pan, an unobstructed space being formed between the bottom of said pan and the side walls and bottom of said casing, a revolving frame inclosing said pan and having side scoops extending lengthwise thereof and said scoops passing through the space between said pan and the side walls and bottom of said casing and making a complete revolution around said pan and being adapted to gather up the juices and grease from the bottom of said casing and deposit them upon the top of the meat.

2. A meat roaster comprising a suitable casing having a curved bottom, a perforated pan suspended within said casing and also curved to correspond with the curve in the bottom of the casing and spaced therefrom and adapted to contain the meat to be cooked, the curved portion of the casing beneath said pan forming a receptacle for the juices and grease, and revolving scoops operating in said space to gather up the juices and grease, and said space being only of sufficient depth to allow the passage of said scoops whereby the bottoms of the casing and of the pan will serve as barriers to the flow of the juices past said scoops during the gathering operation, substantially as described.

3. A meat roaster, comprising a base or lower portion, gatherers or scoops having flanged longitudinal edges bars connecting the ends of said scoops, gudgeons mounted in said bars and having bearings on said base said gudgeons projecting into the space between said bars, and a false bottom having bearings on the inner ends of said gudgeons and adapted to support the roast and spaced from the bottom of said base, substantially as described.

4. A meat roaster comprising a suitable casing, a perforated meat pan pivoted therein and spaced from the bottom of said casing, skewers adapted to be thrust through the perforations in said pan into the meat to secure it in the pan, and revolving basting devices arranged to sweep through the space between said pan and casing, the scoop portions of said basting devices engaging said skewers whereby the said pan and its contents and said basting devices will be revolved simultaneously.

5. A meat roaster comprising a casing, a meat pan pivotally supported therein and spaced from the bottom of the casing, revolving scoops operating between said pan and the bottom of said casing to gather up the juices and deposit them upon the meat, means for securing the meat in said pan and said means projecting into the path of said scoops whereby said pan and the meat will be revolved simultaneously with said scoops.

6. In a meat roaster, a basting device, comprising revolving scoops having flanged longitudinal edges and spouts arranged at intervals in said flanges, those of one flange alternating in position with those in the other flange.

In witness whereof, I have hereunto set my hand this 16th day of January 1906.

JOSEPH D. LEWIS.

Witnesses:
 RICHARD PAUL,
 C. MACNAMARA.